(12) United States Patent
Egglestone et al.

(10) Patent No.: US 11,224,954 B2
(45) Date of Patent: Jan. 18, 2022

(54) NON-CONTACT TOOL SETTING APPARATUS AND METHOD

(71) Applicant: RENISHAW PLC, Wotton-under-Edge (GB)

(72) Inventors: Edward Benjamin Egglestone, Bristol (GB); Andrew Paul Gribble, Bristol (GB)

(73) Assignee: RENISHAW PLC, Wotton-under-Edge (GB)

( * ) Notice: Subject to any disclaimer, the term of this patent is extended or adjusted under 35 U.S.C. 154(b) by 0 days.

(21) Appl. No.: 16/637,415

(22) PCT Filed: Sep. 13, 2018

(86) PCT No.: PCT/GB2018/052600
§ 371 (c)(1),
(2) Date: Feb. 7, 2020

(87) PCT Pub. No.: WO2019/053432
PCT Pub. Date: Mar. 21, 2019

(65) Prior Publication Data
US 2020/0180095 A1    Jun. 11, 2020

(30) Foreign Application Priority Data
Sep. 13, 2017 (EP) .................................. 17190896

(51) Int. Cl.
*B23Q 17/24*     (2006.01)
*G06T 7/13*      (2017.01)
(Continued)

(52) U.S. Cl.
CPC ..... *B23Q 17/2461* (2013.01); *B23Q 17/0914* (2013.01); *G06T 1/0014* (2013.01);
(Continued)

(58) Field of Classification Search
CPC ............ B23Q 17/2461; B23Q 17/0914; B23Q 17/0923; B23Q 17/10; B23Q 17/2466;
(Continued)

(56) References Cited

U.S. PATENT DOCUMENTS 6,496,273 B1    12/2002 Stimpson et al.
2009/0051933 A1*  2/2009 Stimpson ............. G01B 11/024
                                                        356/614
(Continued)

FOREIGN PATENT DOCUMENTS

CN        101389446 A        3/2009
CN        101758423 A        6/2010
(Continued)

OTHER PUBLICATIONS

Mar. 14, 2018 Search Report issued in European Patent Application No. 17 19 0896.
(Continued)

*Primary Examiner* — Nizar N Sivji
(74) *Attorney, Agent, or Firm* — Oliff PLC

(57) ABSTRACT

A non-contact tool setting apparatus, suitable for use with machine tools and the like, is described in which a transmitter emits light that is received by a receiver. An analysis unit is provided for analysing the light received by the receiver and generating a trigger signal therefrom. The receiver includes an imaging sensor, such as a CMOS or CCD sensor, having a plurality of pixels. The analysis unit generates the trigger signal by analysing the light intensity measured by a first subset of the plurality of pixels. This analysis may involve, for example, determining a resultant received light intensity or performing edge detection. The non-contact tool setting apparatus can thus emulate the operation of a laser based non-contact tool setting apparatus whilst also permitting imaging of cutting tools.

13 Claims, 3 Drawing Sheets

(51) Int. Cl.
  *B23Q 17/09* (2006.01)
  *G06T 1/00* (2006.01)
  *G06T 7/20* (2017.01)

(52) U.S. Cl.
  CPC ............... *G06T 7/13* (2017.01); *G06T 7/20* (2013.01); *G06T 2207/30164* (2013.01)

(58) Field of Classification Search
  CPC .......... G06T 7/13; G06T 1/0014; G06T 7/20; G06T 2207/30164
  See application file for complete search history.

(56) References Cited

U.S. PATENT DOCUMENTS

| | | | | |
|---|---|---|---|---|
| 2015/0204798 | A1* | 7/2015 | Nygaard | G06K 9/6202 356/237.2 |
| 2015/0323307 | A1* | 11/2015 | Ruck | G01B 21/047 33/503 |
| 2017/0003113 | A1* | 1/2017 | Pettersson | G01B 21/047 |
| 2017/0211927 | A1* | 7/2017 | Bridges | G01B 21/047 |

FOREIGN PATENT DOCUMENTS

| | | |
|---|---|---|
| CN | 102528562 A | 7/2012 |
| CN | 106290960 A | 1/2017 |
| DE | 202005015438 U1 | 2/2006 |
| DE | 102005026375 A1 | 12/2006 |
| EP | 2631032 A1 | 8/2013 |
| EP | 2633950 A1 | 9/2013 |
| EP | 1 587 648 B1 | 11/2013 |
| JP | H01-321151 A | 12/1989 |
| JP | 2010-019559 A | 1/2010 |
| WO | 2005/085753 A1 | 9/2005 |
| WO | 2007/096585 A1 | 8/2007 |
| WO | 2018/134585 A1 | 7/2018 |
| WO | 2019/048832 A1 | 3/2019 |

OTHER PUBLICATIONS

Dec. 20, 2018 International Search Report issued in International Patent Application No. PCT/GB2018/052600.
Dec. 20, 2018 Written Opinion of the International Searching Authority issued in International Patent Application No. PCT/GB2018/052600.
Liu, Jiang-sheng. "Research on the Technology of Subpixel Border Detection of Tool Presetter," pp. 96-97, Mechanical Engineer, Jul. 2012 (with English Abstract).

* cited by examiner

NON-CONTACT TOOL SETTING APPARATUS AND METHOD

BACKGROUND

The present invention relates to non-contact tool setting apparatus for coordinate positioning apparatus and particularly to non-contact tool setting apparatus comprising an imaging sensor.

Break-beam tool setting devices for use on machine tools are known, for example see U.S. Pat. No. 6,496,273. Tool setting apparatus of this type includes a laser source which generates a beam of laser light which is passed to a photo-detector. During a tool setting operation, the machine tool is operated to move a rotating tool into and out of the light beam at a relatively high speed. Interruption of the light beam by the tool is quickly detected by analysis of the photo-detector output signal and the apparatus generates a so-called "trigger signal" to indicate to the associated machine tool that the light beam has been broken. Typically, this trigger signal is issued when the light level reaches 50% of the "beam clear" state (i.e. when 50% of the optical beam is blocked from reaching the detector). This arrangement allows tool size, such as the tool length and/or tool diameter, to be measured quickly. However, it is time consuming to obtain more information on the tool profile because this requires moving the tool through the beam multiple times to measure the position of multiple points on the edge of the tool.

Video or camera based tool setters are also known. For example, see WO2005/085753 or EP2633950. A typical video tool setter comprises a 2D camera and lens arrangement that takes images of a tool (e.g. a milling tool or lathe tool) to ascertain parameters such as the tool length, diameter and corner radius. Video tool setters are advantageous over laser tool setters of the type described above in that they image a larger area of the tool so can more readily perform tool chip detection and coolant/dirt rejection. The detection of larger features, such as radii and edge blends, is also possible. A distinct disadvantage of video tool setters is the amount of time it takes to read out and process the pixel data from the image sensor. For a typical sensor with around one million pixels, the maximum frame rate is only around 50 Hz. The typical mode of operation for such a system is to bring an edge of the tool into the field of view of the camera. A series of images can then be taken while the tool is spinning to capture images of the tool at roughly 2° spacing. This series of images can then be processed to identify the images where the cutting faces of the tool are at the correct angles for measurement. This results in a typical measurement taking of the order of four seconds. When measuring a tool with a radius larger than the field of view of the camera at least two sets of such images will need to be ascertained to make the measurement. The introduction of such delays into a tool setting process are often unacceptable for high throughput machining operations, where it is wished to make maximum usage of the cutting machine.

EP2631032 describes a hybrid tool setting system in which a beam splitter is used to direct received light to both a camera for imaging a tool and a photodiode or photodiode array for detecting the presence of a tool. For example, see FIG. 9 of EP2631032 and the associated description thereof. This arrangement has the disadvantage of containing multiple elements that need to be aligned relative to each other and carefully calibrated. This makes the hybrid arrangement complex and costly to implement.

SUMMARY

According to a first aspect of the present invention, there is provided a non-contact tool setting apparatus that comprises; a transmitter for emitting light, a receiver for receiving light emitted by the transmitter, and an analysis unit for analysing the light received by the receiver and generating a trigger signal therefrom, characterised in that the receiver comprises an imaging sensor having a plurality of pixels arranged in a two dimensional (2D) array, the analysis unit generating the trigger signal by analysing the light intensity measured by a first subset of the plurality of pixels, the first subset of pixels comprising at least two pixels.

The non-contact tool setting apparatus of the present invention thus provides a break-beam tool detection system that is suitable for use on machine tools or the like. Light emitted by the transmitter (e.g. a beam of light) is passed through a region of free space to the receiver. The receiver thus receives light from the transmitter and generates a trigger signal by analysing the light. The trigger signal can thus be used to indicate to an associated machine tool that an object (e.g. a tool) has attained a certain position relative to the transmitter and receiver. The trigger signal that is generated by the non-contact tool setting apparatus may comprise a voltage level change or voltage pulse that is fed to the SKIP input of a machine tool controller. Alternatively, the trigger signal may be output to the machine tool as a digital data packet (e.g. using the technique described in our prior patent application WO2018/134585). The non-contact tool setting apparatus of the present invention can thus be used with a CNC (computer numerically controlled) machine tool or the like to measure the position of tools or other objects within the coordinate system of the machine tool.

The present invention is characterised by the receiver comprising an imaging sensor having a plurality of pixels (i.e. an imaging sensor comprising a 2D array of pixels). In other words, the 2D imaging sensor has multiple pixels that can each separately detect the intensity of light they receive. In the embodiments described below, the imaging sensor may comprise a square, one-megapixel sensor array (i.e. an array of 1000-by-1000 pixels) or an array of 640-by-480 pixels. It would, of course, be possible to use imaging sensors with pixel arrays of different sizes and/or shape. The analysis unit generates the trigger signal by analysing the intensity of light measured by the first subset of the plurality of pixels (also termed the first subset of pixels hereinafter). In this manner, the intensity of light detected by only some of the pixels of the imaging sensor is used by the analysis unit to generate the trigger signal and thereby indicate the presence of an object in the light beam. As explained below, the analysis performed by the analysis unit may comprise ascertaining when the intensity of received light crosses a threshold (e.g. the trigger signal may be generated when the total intensity of received light drops by 50%) or by determining the position of an edge of an object when it casts a shadow across a particular point on the receiver.

The use of the first subset of pixels means the rate at which the light intensity is detected can be much greater than the frame rate that can be achieved when reading the entire array of pixels. This permits changes in light intensity to be monitored at a similar rate to that possible in prior art apparatus of the type described in U.S. Pat. No. 6,496,273, thereby permitting tool detection to be performed with similar positional accuracy. The apparatus of the present invention is thus, unlike the vision based tool setters described above, fully backwards compatible with prior art systems of the type described in U.S. Pat. No. 6,496,273.

The present invention thus provides a non-contact tool setting apparatus that can operate with similar levels of performance as the apparatus described in U.S. Pat. No. 6,496,273 that uses a single photodiode to detect the amount of light reaching the receiver. However, providing a receiver that comprises an imaging sensor also permits the presently described apparatus to acquire images of tools placed in the light beam. These images may be used to simply image the tool (e.g. for display to an operator), to enable more detailed analysis of tool profile (e.g. to better assess if the tool is damaged) or to check if the tool was contaminated during measurement. The present invention thus provides additional functionality over and above that possible using prior art apparatus of the type described in U.S. Pat. No. 6,496,273. The use of the same imaging sensor for generation of the trigger signal and imaging purposes also provides a cheaper, more compact and more reliable arrangement than the hybrid (beam splitter based) system that is described in EP2631032.

To allow the intensity of received light to be measured at a high rate, it is preferred that the first subset of pixels comprises only a small number of the available pixels of the imaging sensor. The first subset of pixels preferably comprises fewer than ten percent of the total number of pixels of the imaging sensor. The first subset of pixels preferably comprises fewer than five percent of the total number of pixels of the imaging sensor. The first subset of pixels preferably comprises fewer than two percent of the total number of pixels of the imaging sensor. Advantageously, the first subset of pixels comprises fewer than one percent of the total number of pixels of the imaging sensor. Conveniently, the first subset of pixels comprises fewer than one tenth of one percent of the total number of pixels of the imaging sensor. The first subset of pixels may conveniently comprise fewer than one hundredth of one percent of the total number of pixels of the imaging sensor. The imaging sensor preferably comprises more than 100,000 pixels. Advantageously, the imaging sensor may comprise more than 500,000 pixels. Conveniently, the imaging sensor may comprise more than 1,000,000 pixels. Conveniently, the first subset of pixels may comprise fewer than 1000 pixels. More preferably, the first subset of pixels may comprise fewer than 500 pixels. More preferably, the first subset of pixels may comprise fewer than 250 pixels. More preferably, the first subset of pixels may comprise fewer than 150 pixels. More preferably, the first subset of pixels may comprise fewer than 50 pixels. More preferably, the first subset of pixels may comprise fewer than 20 pixels. For example, if the imaging sensor comprises 1,000,000 pixels, the first subset of pixels may comprise only 16 pixels (e.g. a 4×4 sub-array of pixels). An array of 144 pixels (e.g. a 12×12 sub-array of pixel) may be conveniently provided as the first subset of pixels.

Advantageously, the number of pixels contained in the first subset is selected so that the frame rate associated with reading such pixels is sufficiently high to allow tool edge detection to be performed (e.g. with similar accuracy to that attained using prior art laser based tool setters of the type described above). Conveniently, collection and analysis of light received by the first subset of pixels is performed at a rate greater than 200 Hz. Preferably, collection and analysis of light received by the first subset of pixels is performed at a rate greater than 500 Hz. Advantageously, collection and analysis of light received by the first subset of pixels is performed at a rate greater than 1 KHz. Conveniently, collection and analysis of light received by the first subset of pixels is performed at a rate greater than 10 KHz. Preferably, collection and analysis of light received by the first subset of pixels is performed at a rate greater than 20 KHz. More preferably, collection and analysis of light received by the first subset of pixels is performed at a rate greater than 30 KHz. More preferably, collection and analysis of light received by the first subset of pixels is performed at a rate greater than 40 KHz. More preferably, collection and analysis of light received by the first subset of pixels is performed at a rate greater than 50 KHz. Conveniently, collection and analysis of light received by the first subset of pixels is performed at a rate of around 50 KHz.

The analysis unit may analyse the light intensity generated by the first subset of pixels in a variety of different ways in order to generate the trigger signal. As explained below, the light intensity received by the first subset of pixels may be established and compared to a threshold. Alternatively, the pattern of light falling on the first subset of pixels may be analysed to detect the presence of a certain tool feature (such as the edges of tool teeth). It should be noted that the analysis unit may read out more data from the imaging sensor than that which forms the first subset of pixels (e.g. some additional pixel intensity values may be read from the imaging sensor and then discarded to simplify subsequent analysis).

Preferably, the light intensities measured by the pixels forming the first subset are combined to provide a resultant light intensity. The combination (e.g. addition) of the measured light intensity values collected by each pixel may be performed by the analysis unit. Alternatively, such a functionality may be performed by the imaging sensor itself. The analysis unit conveniently compares the resultant light intensity to a threshold. A trigger signal is then issued by the analysis unit when the resultant light intensity crosses the threshold. The threshold may be defined as a proportion (e.g. a percentage) of the beam intensity measured by the first subset of pixels when there is no object obscuring light passing from the transmitter to the receiver (e.g. by reference to a so-called "beam clear" resultant intensity level). For example, the threshold against which the resultant light intensity is compared may be defined as a certain percentage (e.g. 50%) of the "beam clear" resultant intensity level. It should be noted that the measurement process implemented using the apparatus may comprise the tool being moved into the beam (a so-called "light-to-dark" measurement) or out of the beam (a so-called "dark-to-light" measurement). The trigger signal can thus be issued when the threshold is crossed from either, or both, directions.

Instead of, or in addition to, the use of a resultant light intensity as described above the analysis unit may analyse the image or light pattern generated by the first subset of pixels to identify when an object is obscuring the received light. The analysis unit may thus conveniently perform edge detection analysis on the light intensities measured by the first subset of pixels and generate the trigger signal when a tool edge is detected. For example, tool edges (e.g. light-to-dark transitions) present in the image acquired using the first subset of pixels may be identified. A trigger signal may be issued when an edge is identified at a certain location within the first subset of pixels. The edge detection analysis may comprise determining any light-to-dark (or dark-to-light) transitions in the image that is acquired using the first subset of pixels. This may be done on a row-by-row and/or column-by-column basis to identify the edge of a tool from the edge of the shadow cast on the imaging sensor of the receiver. Any such transitions that are identified in the image may be fitted to a function (e.g. a straight line) to establish an edge position. Any such image analysis is preferably simple and quick to perform to enable it to undertaken at the required rate.

The pixels forming the first subset of pixels may comprise one or more groups of pixels. If the first subset of pixels comprises a plurality of groups of pixels, such groups of pixels may be located at different positons on the imaging sensor. For example, groups of pixels may be located near the corners or edges of the imaging sensor. The pixels forming the first subset of pixels may all be grouped together on the imaging sensor. In other words, the first subset of pixels may comprise a plurality of adjacent (i.e. directly adjacent) pixels. The first subset of pixels may be formed in any suitable shape. For example, the first subset of pixels may form a square or rectangular sub-array. The first subset of pixels may also form a linear array (e.g. the first subset of pixels may comprise a line or parallel lines of pixels). The first subset of pixels may form intersecting row(s) and column(s) of pixels (e.g. forming a cross-shaped pattern of pixels). The first subset of pixels may extend a distance shorter than the dimensions of the imaging array (i.e. they may extend a distance less than the distance across the whole imaging sensor). The shape formed by the first subset of pixels may be altered during use (e.g. to allow different tools or tool features to be measured) or to track motion of a tool edge across the imaging sensor.

The first subset of pixels may be located anywhere on the imaging sensor. Advantageously, the first subset of pixels may be located substantially near or at the centre of the array of pixels of the imaging sensor. The location of the first subset of pixels may be adjustable. For example, the location of the first subset of pixels may be adjusted by a user for tool alignment or calibration purposes. In this manner, the location of the first subset of pixels may be altered to adjust the trigger position instead of physically adjusting the location of the apparatus relative to the tool bed. The location of the first subset of pixels may also be adjusted to align the trigger position of the present apparatus with that of another tool setting apparatus (e.g. a contact or non-contact tool setter). This may be used, for example, to provide offset alignment of multiple tool setting apparatus installed on a multi-tool (e.g. dual spindle) machine tool. The location of the first subset of pixels may also be adjusted during use by the analysis unit. For example, the location of the first subset of pixels may be shifted on the imaging sensor to track an edge of a tool that is moving across the imaging sensor. The analysis unit may then issue the trigger signal when the tool edge reaches a certain location on the imaging sensor.

The apparatus may be configured to measure a non-rotating tool (i.e. so the only motion of the tool during measurement is movement of the tool into, or out of, the light beam). The apparatus may be configured to measure a tool that is being rotated (e.g. by the spindle of an associated machine tool). Conveniently, the tool being measured is rotated about its longitudinal axis whilst it is translated relative to the receiver. The tool being measured may comprise one or more cutting teeth. Advantageously, the tool being measured comprises a plurality of cutting teeth.

Advantageously, the analysis unit is configured to analyse the variation in light intensity (i.e. as received by the first subset of pixels) as a function of time for a rotating tool (i.e. that is partially obscuring the light). Such analysis is preferably used to measure the speed of tool rotation. The high frame rate that is possible when using intensity information from only the first subset of pixels makes such analysis of the tool rotation speed possible. The analysis of maxima and/or minima in the received light intensity, as described in EP1587648, may also be performed. The apparatus may also be used to implement the tool profile analysis technique described in our co-pending international patent application no. PCT/GB2018/052472.

Advantageously, the analysis unit is also configured to capture one or more images of the tool using the imaging sensor. In other words, the apparatus may be used as a conventional tool vision system. This is preferably done at a different time to measuring the intensity from only the first subset of pixels. For example, an image of the tool may be captured after the trigger condition has been met (and a trigger signal generated). The one or more images of the tool are conveniently acquired using all of the plurality of pixels of the imaging sensor. Advantageously, the one or more images of the tool are acquired using a second subset of the plurality of pixels of the imaging sensor. The second subset of pixels is preferably different to the first subset of pixels. The second subset of pixels preferably comprises more (e.g. many more) pixels than the first subset of pixels. For example, the second subset of pixels may comprise at least ten percent of the pixels of the imaging sensor. Preferably, the second subset of pixels may comprise at least one quarter of the pixels of the imaging sensor. The second subset of pixels used to capture the tool image may be selected to form an imaging area that covers a feature or features of the tool to be imaged. For example, the periphery or a key feature of a cutting tool may be imaged. In one embodiment described below, the second subset may comprise a sub-array of 100×1000 pixels in a 1000×1000 pixel array.

Images of the tool may be captured using the second subset of pixels at any convenient time during the measurement process. Advantageously, the analysis unit captures one or more images (i.e. of the tool) after a trigger signal is generated by the analysis which indicates that an edge of the tool being measured is at least partially obscuring the light (i.e. it is located in the light beam). In this manner, the analysis unit conveniently analyses the light intensity received by the first subset of pixels until the trigger condition is met (e.g. an intensity threshold is crossed) and the trigger signal issued. The analysis unit then captures one or more images of the tool using the second subset of pixels, or all the pixels, of the imaging sensor. After image acquisition, the analysis unit may conveniently return to monitoring the light intensity received by the first subset of pixels.

As explained above, the analysis unit may measure the speed of tool rotation. Once the tool rotation speed is known, it is possible to predict when a certain tool feature will be oriented such that it can be imaged by the imaging sensor. The tool rotation information can thus be used to time or synchronise image collection so that images can be taken of any desired tool feature(s), such as cutting edges. The one or more images captured by the analysis unit (i.e. using the second subset of pixels) are thus preferably synchronised with the measured (i.e. known) speed of tool rotation to allow images of the rotating tool to be acquired when it is rotated into one or more defined positions. This allows images to be captured of tool features (e.g. cutting edges) without having to take many such images, most of which are discarded during image analysis.

The transmitter may comprise a light source. The light source may be a diffuse light source. The light source may be a focussed light source. The light source may be a collimated or substantially collimated light source. The light source may generate a beam of light. Advantageously, the transmitter comprises a light emitting diode (LED) for generating the light beam. The LED may be a high intensity LED. Alternatively, a laser may be used. The transmitter may also comprise optics for providing a substantially collimated light beam. Alternatively, the transmitter may comprise optics to provide a focussed light beam. The light beam may have a substantially circular profile. The light emitted by the transmitter may be dimensioned to cover the whole of the imaging sensor. For example, a light beam may be provided having a beam diameter of more than 1 mm. Preferably, a light beam is provided having a beam diameter of more than 3 mm. Conveniently, a light beam is provided having a beam diameter of more than 10 mm. More preferably, a light beam may be provided having a beam diameter of more than 20 mm. The transmitter illuminates the tool from the rear (from the perspective of the receiver), but it is also possible to provide an additional light source (e.g. an LED) that illuminates the tool from the front (again from the perspective of the receiver). Such front illumination of the tool may be desirable in some instances (e.g. when acquiring tool images for visual inspection).

The imaging sensor may comprise a charge-coupled device (CCD) or a complementary metal-oxide semiconductor (CMOS) device. The imaging sensor may be a global shutter imaging sensor. Alternatively, a rolling shutter imaging sensor may be provided. Advantageously, the imaging sensor comprises a data bus that allows the intensity measured by the pixels of the image sensor to be accessed (e.g. by the analysis unit).

The analysis unit may be contained in the same housing as the receiver or it may be provided in a separate interface. The various function of the receiver and analysis unit may also be distributed over multiple locations (e.g. using processors or bespoke circuits located in the tool setting housing or associated interfaces, controllers etc). The invention should not therefore be seen as being limited to a particular physical configuration of the various light receiving and analysis components. The tool setting apparatus may be used with any suitable coordinate positioning apparatus. Advantageously, the coordinate positioning apparatus is a machine tool (e.g. a computer numerically controlled or CNC machine tool). Alternatively, the coordinate positioning apparatus may be a coordinate measuring machine (CMM), a flexible gauge (such as the Equator system sold by Renishaw plc, Wotton-Under-Edge, UK) or an offline tool inspection apparatus etc. The trigger signal generated by the analysis unit is preferably usable by the coordinate positioning apparatus for metrology purposes.

According to second aspect of the present invention, there is provided a method of non-contact tool measurement, the method comprising passing light from a transmitter to a receiver and generating a trigger signal when an object at least partially obscures the light, characterised by the receiver comprising an imaging sensor having a plurality of pixels arranged in a two-dimensional array, the method comprising the step of generating the trigger signal by analysing the light intensity measured by a first subset of the plurality of pixels, the first subset of pixels comprising two or more pixels. The method may be implemented using any of the features or uses of the apparatus that are described above. The method may also comprise using the trigger signal to measure a tool dimension (e.g. tool length, diameter etc). For example, the trigger signal may be passed to an associated numeric controller of the coordinate positioning apparatus.

Also described herein is a non-contact tool setting apparatus comprising; a transmitter for emitting a light beam, a receiver for receiving the light beam, and a trigger unit for generating a trigger signal when the intensity of light received by the receiver crosses an intensity threshold, wherein the receiver comprises a light detector having a plurality of sensing elements, the trigger unit generating the trigger signal when the resultant intensity of light sensed by the plurality of sensing elements crosses the intensity threshold. The plurality of sensing elements may be a subset of pixels of an imaging sensor.

Also described herein is a non-contact tool setting apparatus that comprises a transmitter for emitting light and a receiver for receiving light emitted by the transmitter. An analysis unit may be provided for analysing the light received by the receiver and generating a trigger signal therefrom. The receiver may comprise an imaging sensor. The imaging sensor may have a plurality of pixels arranged in a two-dimensional (2D) array. The analysis unit may generate the trigger signal by analysing the light intensity measured by a first subset of the plurality of pixels. The first subset of pixels may comprise a single pixel. The first subset of pixels (i.e. the first subset of the plurality of pixels) preferably comprises at least two pixels (i.e. a plurality of pixels). The at least two pixels forming the first subset may all be adjacent (i.e. directly adjacent) one another. Alternatively, the at least two pixels may be separated by pixels that do not form part of the first subset. The apparatus may include any of the other features described herein, either alone or in any combination with other features.

BRIEF DESCRIPTION OF THE DRAWINGS

The invention will now be described, by way of example only, with reference to the accompanying drawings, in which.

DETAILED DESCRIPTION

Figure 1:
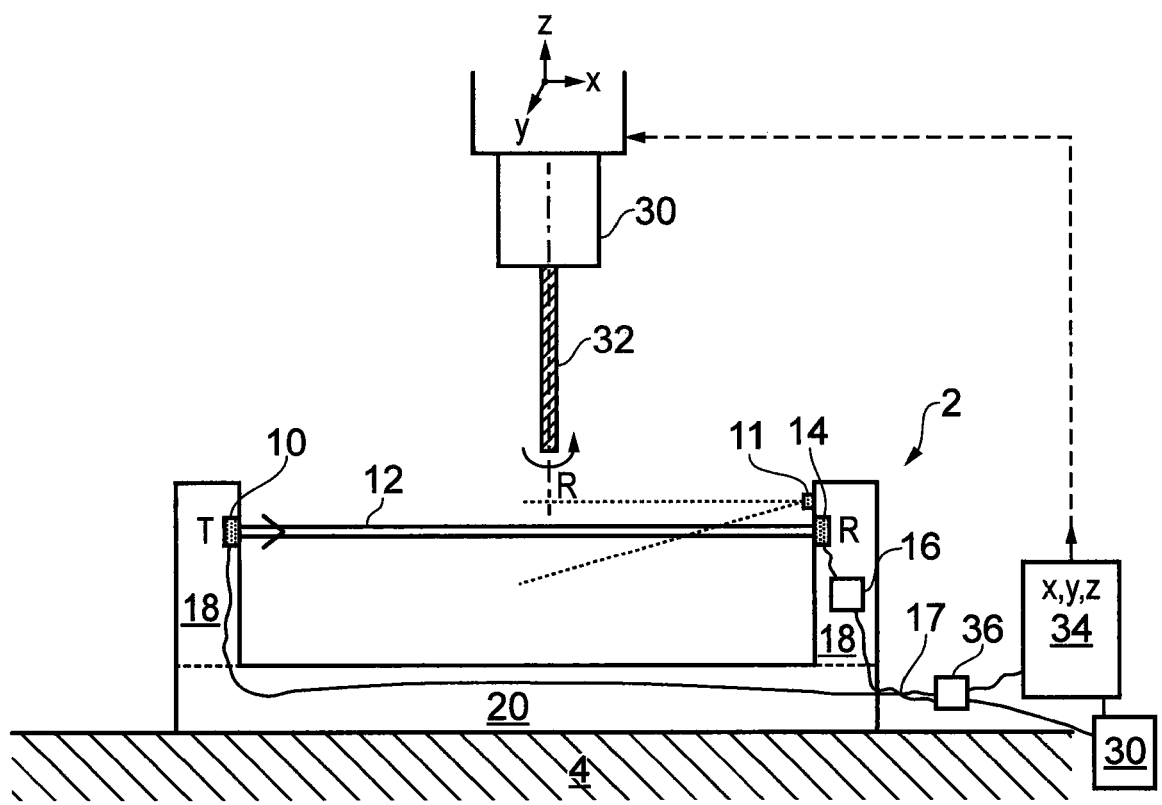
FIG. 1 shows a non-contact tool setting apparatus of the present invention.

Referring to FIG. 1, a tool setting apparatus 2 of the present invention is illustrated mounted to the bed 4 of a machine tool. The tool setting apparatus 2 comprises a transmitter 10 for generating a substantially collimated beam of light 12. The transmitter 10 comprises a light source (e.g. an LED) and suitable optics (not shown) are also provided for generating the collimated beam of light 12. A receiver 14 is also illustrated for receiving the beam of light 12. As will be explained in more detail below, the receiver 14 comprises an imaging sensor comprising an array of 1000 by 1000 pixels (i.e. a 1 Megapixel array). The receiver 14 also comprises optics (not shown) that image the tool onto the imaging sensor 60. The light beam 12 is dimensioned to illuminate substantially all of the pixels of the imaging sensor. The imaging sensor 60 (shown in FIG. 2) of the receiver 14 is electronically connected to an analysis unit 16 (e.g. comprising a processor) that analyses intensity data collected by the imaging sensor 60.

The transmitter 10 and receiver 14 are both affixed to a common base 20 by pillars 18. This arrangement ensures the transmitter 10 and receiver 14 maintain a fixed spacing and orientation relative to one another. The base 20 may then be mounted directly to the bed 4, or indeed any appropriate part, of a machine tool. It should also be noted that various alternative structures for mounting the transmitter and receiver could be used. For example, a common housing for the transmitter and receiver could be provided or discrete transmitter and receiver units could be separately mounted to the machine tool.

The machine tool includes a spindle 30 for holding a tool 32. The spindle is rotatable about rotation axis R (i.e. to allow the tool to be rotated about its longitudinal axis). The spindle 30 is rotated and moved around within the machine tool under the controller of a numerical controller or NC 34. The tool setting apparatus 2 is also connected to the NC 34 via an interface 36. The interface 36 is connected to the transmitter 10 and the analysis unit 16 via electrical cables 17. The interface 36 also provides electrical power to the various parts of the tool setting apparatus. In addition, the interface 36 is connected to an external computer 40. In use, the machine tool (under control of the NC 34) can move the tool 32 into, and out of, the light beam 12 thereby allowing the tool to be measured. For example, the tool length or diameter may be measured and such measured dimensions used in subsequent cutting operations performed by the machine tool.

Figure 2:
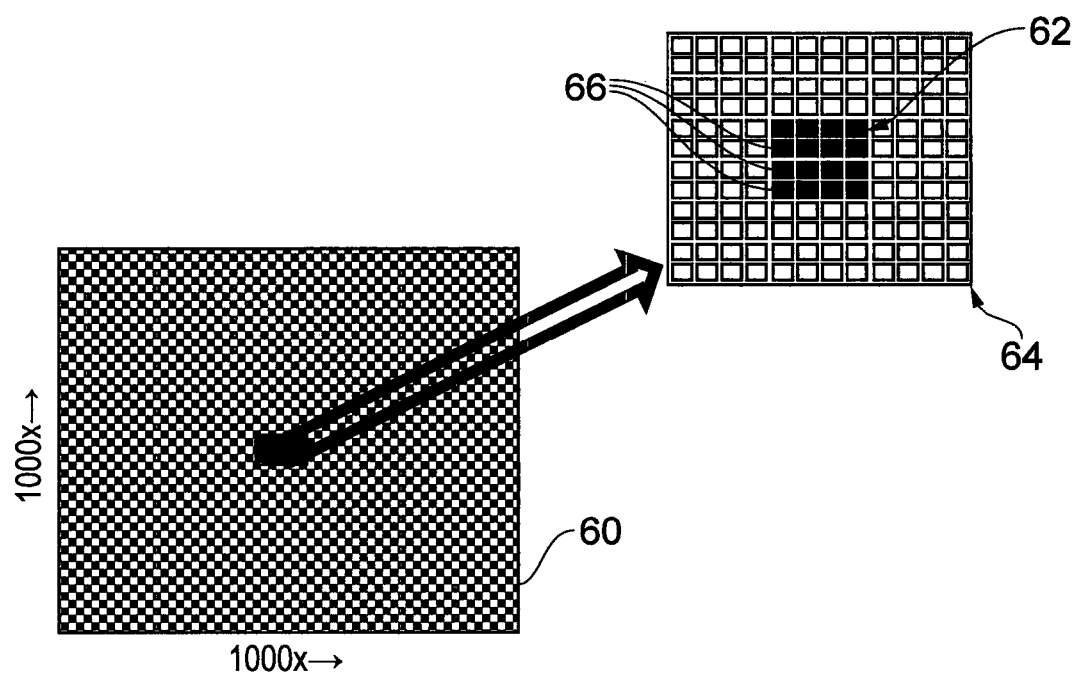
FIG. 2 shows an imaging sensor and a first sub-set of pixels of that sensor which are used for tool detection.

Referring additionally now to FIG. 2, the operation of the tool setting apparatus 2 will be explained in more detail. As mentioned above, the receiver 14 comprises an imaging sensor 60 having a 1000-by-1000 array of pixel elements. Each of these pixel elements can detect the intensity of received light and the received light intensity from every pixel can be read out from the imaging sensor 60. However, reading the intensity data from the one million pixels can only be done at a rate of around 50 Hz even though the bus speed of the imaging sensor is around 50 MHz. For comparison, a typical prior art laser based tool setter would read the beam intensity from a single photodiode at a rate of more than 20 KHz. If a trigger signal is to be generated when a certain proportion of the beam (e.g. 50%) is blocked by a tool passing into the beam, the rate at which the beam intensity is measured dictates the accuracy of the position measurements that are possible for a given speed of tool movement. It can thus be seen that reducing the rate of beam intensity measurement from 20 KHz to 50 Hz would greatly decrease measurement precision or mean the tool had to be moved at a much slower speed.

The tool setting apparatus 2 thus uses an analysis unit 16 to extract beam intensity information from only a very small subset 62 of the pixels of the imaging sensor 60. In the present example, the light intensity received by a subset 62 of only sixteen pixels of the one million pixels of the imaging sensor 60 is passed to the analysis unit 16; these sixteen pixels are shown as solid blocks 66 in the expanded view of the imaging sensor 60 provided in the inset 64 to FIG. 3. In this manner, it has been found to be possible to extract intensity data (i.e. for the sixteen pixels of the subset of pixels) at a rate of up to 100 KHz.

The analysis unit 16 then combines (i.e. sums) the intensity values measured by each of the subset 62 of the pixels of the imaging sensor to produce a resultant beam intensity value. The analysis unit 16 also compares the resultant beam intensity value to a threshold. In particular, a "beam clear" intensity value is set to equal the resultant beam intensity value that occurs when no object is located in the light beam 12. The analysis unit 16 may then compare the resultant beam intensity value to the beam clear intensity value and issue a trigger signal when a certain intensity threshold is crossed. For example, the trigger signal may be issued when the resultant beam intensity value crosses a threshold equal to half the beam clear intensity value. This trigger signal may then be communicated to the NC 34 via the interface 36.

The tool setting apparatus 2 can thus emulate the operation of a laser based tool setter that includes a single element photodiode. The 20 KHz frame rate for generating the resultant beam intensity value means that measurements have a similar accuracy to prior art tool setting systems. This also allows the tool setting apparatus 2 to replace an existing laser based tool setter without having to alter the measurement routines that are used with the apparatus. In other words, backward compatibility with existing laser based tool setters can be provided. The tool setting apparatus 2 can, however, also provide additional measurement functionality as will be described below.

Figure 3:
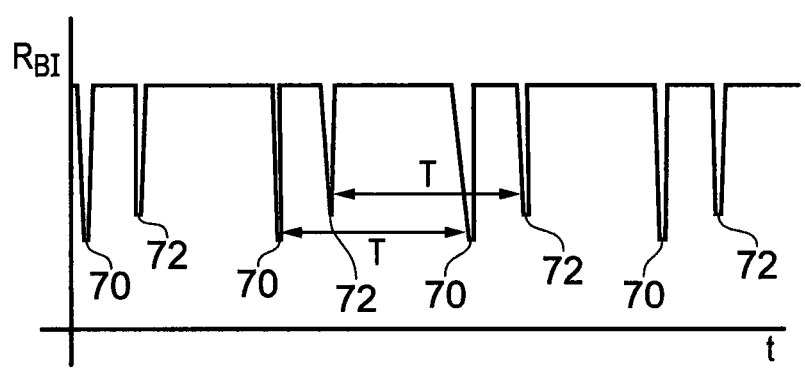
FIG. 3 shows the beam intensity collected as the edge of a rotating tool is located in the light beam.

Referring to FIG. 3, the resultant beam intensity value (RBI) is plotted as a function of time whilst the periphery of a two-tooth cutting tool is being rotated in the light beam. The minima 70 correspond to the first tooth obscuring part of the light beam and the minima 72 correspond to a second tool obscuring part of the light beam. The minima 70 and 72 are spaced apart from other similar minima by a time T that is related to the (substantially) constant speed of rotation of the tool 32. The 20 KHz frame rate used for acquiring the resultant beam intensity signal means that the time each intensity minima 70 or 72 occurs can be measured accurately. This means it is also possible to predict when a certain tooth of the tool is going to be positioned to occlude the light beam 12. This timing information may then be used to allow a full image of the tool to be captured (i.e. an image acquired using all, or most, of the pixels of the imaging sensor) when the tool is in a certain rotational position. In particular, this allows an image of each of the two teeth of the tool to be collected when those teeth are appropriately orientated relative to the imaging sensor 60. An additional light source 11 may also be provided to illuminate the front of the tool (i.e. the side of the tool facing the camera) if the backlighting provided by the light source 10 is insufficient.

The analysis unit 16 may thus be configured to operate in both the tool edge detection mode (i.e. a "laser emulation" mode) that is mentioned above or in an imaging mode. Furthermore, the tool edge detection mode may be used to obtain timing information that is subsequently used in the imaging mode to enable images to be captured of desired tool features. In this manner, the requirement when using a traditional video tool setter to collect many images of a tool (e.g. separated by 2° of rotation) and identify the images of interest is removed. Instead, the acquired timing information allows only the required images to be captured. The time required to perform video based tool analysis can thus also be reduced.

The analysis unit 16 also allows both tool edge detection and image capture to be performed sequentially in a manner that appears similar to the operation of a traditional laser-based tool setter. In particular, the end of the tool 32 may be moved towards the light beam 12 whilst the analysis unit 16 is operating in the tool edge detection mode. When the tool 32 enters the light beam and obscures 50% of the light reaching the subset 62 of pixels, a trigger signal is issued to the NC 34. The NC 34 records the position of the spindle at the instant the trigger signal was received (i.e. to allow the position of the edge of the tool to be determined) and also halts linear motion of the tool. The analysis unit 16 continues to monitor the resultant beam intensity to allow timing information to be found for the tool 32 (which is still being rotating in the light beam). The analysis unit 16 then switches into the imaging mode and acquires images of the cutting teeth of the tool. The collection of the timing information and acquisition of the images may be done in very short period of time and prior to the tool being moved out of the light beam for the next measurement or cutting operation. The tool edge position information may be used by the NC 34 (e.g. to set or verify a tool diameter or tool length value stored in the tool table) and/or the collected images may be passed to a computer 40 for additional image processing (e.g. to obtain more tool information that can be passed to the NC 34) or simply to allow images of the tool cutting teeth to be shown to an operator or stored for later analysis.

Figure 4:
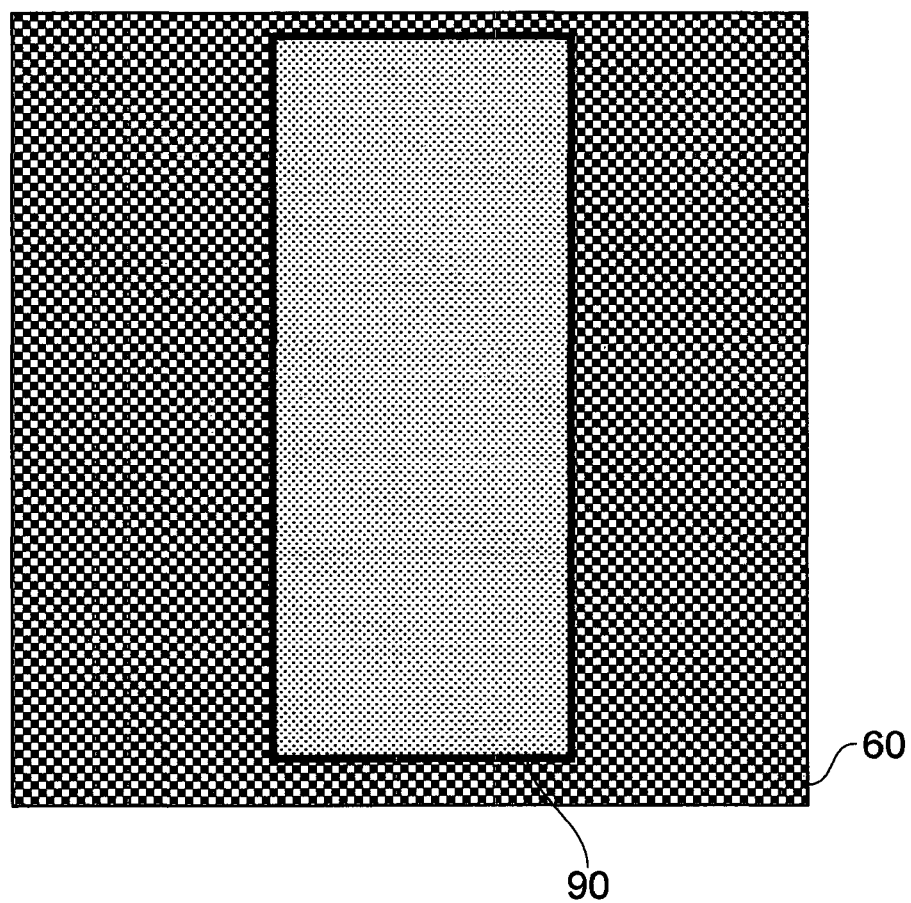
FIG. 4 shows a second sub-set of pixels of the sensor that are used for capturing one or more tool images.

Referring to FIG. 4, the time associated with capturing images of a tool (i.e. during the imaging mode mentioned above) may be further reduced. FIG. 4 shows the imaging sensor 60 having an array of 1000 by 1000 pixels. The tool image may be acquired using only a subset of the pixels of the array, as indicated by the region 90 shown in FIG. 4. The region 90 of the array from which the intensity signal from the pixels is extracted (which is approximately 300 by 900 pixels in this example) may cover a region where the tool edge being inspected is expected to be located. The region 90 may be variable, based on the tool feature being measured. The use of a such a (second) subset of pixels when capturing images can increase the image capture speed thereby reducing the measurement time required to collect an image.

Although the present invention can be implemented using a variety of commercially available imaging sensors, one example of a suitable imaging sensor is the LUPA300 CMOS imaging sensor produced by On Semiconductor, a company with headquarters in Phoenix, Ariz., USA. This imaging sensor comprises 307200 pixels that are provided in a 640×480 array. A first subset of pixels has been defined as a 12×12 sub-array and this sub-array has been read out at a rate of 50 KHz. It would, of course, be possible to use other imaging sensors.

The skilled person would appreciate that variations to the above embodiments that are possible. For example, the method could be implemented using non-contact tool setting apparatus mounted on any co-ordinate positioning apparatus (e.g. a CMM, robot, off-line tool inspection system etc) and not just on a machine tool. The above examples also show a specific arrangement of analysis units, transmitters, receivers, interfaces etc. The skilled person would appreciate that the functionality provided by the different components described above could be located in any suitable part of the system. For example, the analysis unit could be a single processor unit in one location or distributed over multiple locations. The analysis unit could also be integrated with the imaging sensor, or provided in an interface or as part of the machine tool to which the apparatus was mounted. After reading the above, the skilled person would be aware of the various different arrangements that would be possible.

The invention claimed is:

1. A non-contact tool setting apparatus, comprising:
a transmitter for emitting light,
a receiver for receiving light emitted by the transmitter, and
an analysis unit for analysing the light received by the receiver and generating a trigger signal therefrom, wherein:
the receiver comprises an imaging sensor having a plurality of pixels arranged in a two-dimensional array in which pixels of the plurality of pixels are arranged in a first direction and pixels of the plurality of pixels are arranged in a second direction perpendicular to the first direction,
the analysis unit generates the trigger signal by analysing light intensity measured by a first subset of the plurality of pixels, the first subset of pixels comprising two or more pixels, and
the light intensities measured by the pixels forming the first subset of pixels are combined to provide a resultant light intensity, the analysis unit generating the trigger signal when the resultant light intensity crosses a threshold.

2. An apparatus according to claim 1, wherein the first subset of pixels comprises fewer than five percent of a total number of pixels of the imaging sensor.

3. An apparatus according to claim 1, wherein the imaging sensor comprises more than 100,000 pixels and the first subset of pixels comprises fewer than 500 pixels.

4. An apparatus according to claim 1, wherein the intensity of light received by the first subset of pixels is generated at a rate greater than 1 KHz.

5. An apparatus according to claim 1, wherein the first subset of pixels comprises a plurality of adjacent pixels.

6. An apparatus according to claim 1, wherein the analysis unit is also configured to analyse variation in light intensity received by the first subset of pixels as a function of time for a rotating tool, the analysis being used to measure speed of tool rotation.

7. An apparatus according to claim 1, wherein the analysis unit is also configured to capture one or more images of the tool using the imaging sensor.

8. An apparatus according to claim 7, wherein the one or more images of the tool are acquired using all of the plurality of pixels of the imaging sensor.

9. An apparatus according to claim 7, wherein the one or more images of the tool are acquired using a second subset of the plurality of pixels of the imaging sensor, the second subset of pixels being different to the first subset of pixels.

10. An apparatus according to claim 7, wherein the analysis unit captures one or more images after the trigger signal is generated, the trigger signal being used to indicate that an edge of the tool being measured is at least partially obscuring the light.

11. A non-contact tool setting apparatus, comprising:
a transmitter for emitting light,
a receiver for receiving light emitted by the transmitter, and
an analysis unit for analysing the light received by the receiver and generating a trigger signal therefrom, wherein:
the receiver comprises an imaging sensor having a plurality of pixels arranged in a two-dimensional array,
the analysis unit generates the trigger signal by analysing light intensity measured by a first subset of the plurality of pixels, the first subset of pixels comprising two or more pixels,
the analysis unit is also configured to capture one or more images of the tool using the imaging sensor,
the analysis unit is also configured to analyse variation in light intensity received by the first subset of pixels as a function of time for a rotating tool, the analysis being used to measure speed of tool rotation, and
the one or more images captured by the analysis unit are synchronised with the measured speed of tool rotation to allow images of the rotating tool to be acquired when it is rotated into one or more defined positions.

12. An apparatus according to claim 1, wherein the transmitter comprises a light emitting diode for generating the light.

13. A method of non-contact tool measurement, the method comprising
- passing light from a transmitter to a receiver, the receiver comprising an imaging sensor having a plurality of pixels arranged in a two-dimensional array in which pixels of the plurality of pixels are arranged in a first direction and pixels of the plurality of pixels are arranged in a second direction perpendicular to the first direction, and
- generating a trigger signal when an object at least partially obscures the light by analysing light intensity measured by a first subset of the plurality of pixels, the first subset of pixels comprising two or more pixels,
- wherein the light intensities measured by the pixels forming the first subset of pixels are combined to provide a resultant light intensity, and the trigger signal is generated when the resultant light intensity crosses a threshold.

* * * * *